US006906252B2

(12) United States Patent
Matsuzoe et al.

(10) Patent No.: US 6,906,252 B2
(45) Date of Patent: Jun. 14, 2005

(54) CONNECTION TYPE FOOT PEDAL

(75) Inventors: Takashi Matsuzoe, Tokyo (JP); Haruhiko Maehara, Tokyo (JP); Akio Kawada, Chiba (JP)

(73) Assignee: MK Corporation, Tokyo (JP)

( * ) Notice: Subject to any disclaimer, the term of this patent is extended or adjusted under 35 U.S.C. 154(b) by 67 days.

(21) Appl. No.: 10/687,821

(22) Filed: Oct. 20, 2003

(65) Prior Publication Data

US 2004/0079218 A1 Apr. 29, 2004

(30) Foreign Application Priority Data

Oct. 29, 2002 (JP) ....................................... 2002-314154

(51) Int. Cl.[7] ................................................ G01D 13/02
(52) U.S. Cl. ..................... 84/422.2; 84/422.1; 84/422.3
(58) Field of Search ............................. 84/422.1, 422.2, 84/422.3; 248/682, 560, 200, 205.1

(56) References Cited

U.S. PATENT DOCUMENTS 5,396,826 A * 3/1995 Lombardi .................. 84/422.1
6,307,136 B1 * 10/2001 Sikra et al. ................ 84/422.1
6,509,518 B2 1/2003 Shigenaga
2002/0017186 A1 2/2002 Shigenaga

* cited by examiner

*Primary Examiner*—Kimberly Lockett
(74) *Attorney, Agent, or Firm*—Birch, Stewart, Kolasch & Birch, LLP

(57) ABSTRACT

In a connection type foot pedal of a dual type drum pedal, for example, a first base plate (101) on which a foot pedal (100) for a bass drum serving as a foot pedal for a left foot of a player has been mounted and a second base plate (201) of which a foot pedal (200) for hi-hat cymbals has been mounted are connected and fixed to each other by a connecting tool comprising hinges (120) and (220) and a fixing tool constituted with a first fixing portion (130), a second fixing portion (230) and a fixing screw (250). The foot pedal (200) for hi-hat cymbals is made rotatable within a horizontal plane and the angle thereof is made adjustable to the foot pedal (100) for a bass drum. Accordingly, a connection type foot pedal is provided where a foot pedal for hi-hat cymbals and a foot pedal for a bass drum with a simple constitution.

4 Claims, 13 Drawing Sheets

CONNECTION TYPE FOOT PEDAL

This nonprovisional application claims priority under 35 U.S.C. § 119(a) on patent application Ser. No. 2002-314154 filed in JAPAN on Oct. 29, 2002, which is herein incorporated by reference.

BACKGROUND OF THE INVENTION

1. Field of the Invention

The present invention relates to a connection type foot pedal constituted by connecting a foot pedal for a bass drum and a foot pedal for hi-hat cymbals.

2. Description of the Related Art

As is well-known, a drum system is constituted with a bass drum, a snare drum, a bass tom, a tom-tom, a cymbal, hi-hat cymbals and the like.

The hi-hat cymbals are attached to a hi-hat cymbal stand and it is played by stepping operation of a foot pedal for hi-hat cymbals to beat two cymbals or by beating two cymbals which have been separated from each other or which have been brought in contact with each other by a stick(s).

Further, the bass drum is constituted so as to be beat by swinging of a beater according to stepping operation of a food pedal for a bass drum (hereinafter, referred to as "a bass drum foot pedal").

Here, a double drum pedal which can be stepping-operated by both left and right feet of a player is used for the bass drum in some cases. The double drum pedal will be briefly explained with reference to the drawing. FIG. 13 is an explanatory view of a double type drum pedal. As shown in FIG. 13, a double type drum pedal has bass drum foot pedals disposed on both left and right sides, and it swings two beaters to beat bass drums (not shown).

Such a double drum pedal is provided with a foot pedal 10 for a right foot of a player, a foot pedal 20 for a left foot of a player and a connecting rod portion 30.

When a pedal main body 11 of the foot pedal for a right foot 10 is stepped in, a shaft 13 is rotated via a stepping force transmitting portion 12 and only a first beater 14 mounted to the shaft 13 is swung (a second beater 24 is not swung) to beat a drum (not shown).

Further, when a pedal main body 21 of the foot pedal for a left foot 21 is stepped in, a shaft 23 is rotated via a stepping-in force transmitting portion 22 and only a second beater 24 is swung (the first beater 14 is not swung) via the connection rod portion 30 to beat the drum (not shown). The double type drum pedal is constituted in this manner, and it can realize drum sounds of various rhythms by changing stepping-in timings of the right and/or left foot pedals 10 and 20.

The foot pedal 20 for a left foot shown in FIG. 13 is usually disposed in parallel to a foot pedal for hi-hat cymbals due to a positional restriction in many cases.

When the foot pedal for hi-hat cymbals and the bass drum foot pedal are arranged side by side, the pedals are arranged in a mechanically connected state of both the pedals in order to prevent each pedal from deviating from its predetermined position and prevent the pedals from interfering with each other. A connecting tool for a drum set used for such a connection has been disclosed in, for example, Patent Document 1 (Japanese Patent Application Laid-open No. 2002-41032A (refer to Paragraphs [0012] to [0018], FIG. 3 and the like)).

According to a conventional art described in the Patent Document 1, a first connecting tool is first fixed to a frame of a stand for hi-hat cymbals. The fixation is performed by holding a strut of the frame between a first fixing portion of the first connecting tool and a plate to join the first fixing portion and the plate by two bolts. Further, a second connecting tool is fixed to the frame, but the fixation is conducted by clamping the second connecting tool with a clamping tool. A second fixing portion of the first connecting tool is placed on the second connecting tool, and the first and second connecting tool are jointed by fastening a bolt inserted into elongated holes formed in the first and second connecting tools.

According to the conventional art, the foot pedal for hi-hat cymbals and the bass drum foot pedal can securely be connected to each other side by side, but there occur the following problems.

There is a problem that mounting takes much time and/or labor, because the first and second connecting tools are required for the mounting.

There is a possibility or concern that, since a bolt is inserted into a plurality of elongated holes and it is fastened and fixed, a fastening and fixing force becomes weak, so that, for example, when a foot pedal operation is performed hard, vibrations are transmitted to the bolt, which may result in loosening of the bolt and movement thereof in the elongated holes.

SUMMARY OF THE INVENTION

The present invention has been achieved in order to solve the above problems. It is an object of the invention to provide a connection type foot pedal where connection of a foot pedal for hi-hat cymbals and a foot pedal for a bass drum is made reliable and firm with a simple constitution.

In order to solve the above problems, a first aspect of the present provides a connection type foot pedal comprising:

a first base plate which is attached with a foot pedal for a bass drum which beats a bass drum by swinging a beater according to stepping operation of a pedal main body of the foot pedal for a bass drum;

a second base plate which is attached with a foot pedal for hi-hat cymbals for beating top and bottom cymbals to each other according to stepping operation of a pedal main body of the foot pedal for hi-hat cymbals;

a connecting tool which connects the first base plate and the second base plate to each other;

a fixing tool which fixes the first base plate and the second base plate, wherein one of two parts of a hinge serving as the connecting tool is attached to the first base plate and the other thereof is attached to the second base plate, the fixing tool is provided with a first fixing portion fixed to the first base plate, a second fixing portion fixed to the second base plate and a fastening portion which fastens the first fixing portion and the second fixing portion, and the first base plate and the second base plate are connected to each other by the hinge and the first fixing portion and the second fixing portion are connected and fixed to each other by the fastening portion.

A second aspect of the present invention provides the connection type foot pedal according to the first aspect, wherein the foot pedal for a bass drum is one foot pedal of two connected drum pedals.

A third aspect of the present invention provides the connection type foot pedal according to the first or the second aspect, wherein the foot pedal for hi-hat cymbals is fixable to the first base plate after being swung by a predetermined angle within a plane defined by a face of the first base plate.

According to the above aspects of the present invention, a connection type foot pedal where a foot pedal for hi-hat cymbals and a foot pedal for a bass drum are firmly connected with a simple structure can be provided.

That is, in the invention, the foot pedal for a bass drum and the foot pedal for hi-hat cymbals are connected to each other via the first base plate and the second base plate. Further, with the connecting tool, the first and second base plates are connected by inserting the axial portion of one part of two parts of the hinge in the hole portion of the other of the parts which has a diameter slightly larger than the diameter of the axial portion and they are fixed to each other by the fixing tool. Therefore, even if vibrations are transmitted to the first and second base plates due to hard pedal operation of a player, the first and second base plates are prevented from being separated from each other, so that positions of the foot pedal for hi-hat cymbals and the foot pedal for a bass drum, and an angle between the both foot pedals can be kept constant.

Further, since the first base plate and the second base plate are connected integrally to be brought in plane contact with a floor face, both the pedals can be fixed in a stable state and deviation and/or unstableness or chattering of both the pedals can be prevented during playing.

PREFERRED EMBODIMENTS OF THE INVENTION

An embodiment of the present invention will be explained below with reference to the drawings.

Figure 1:
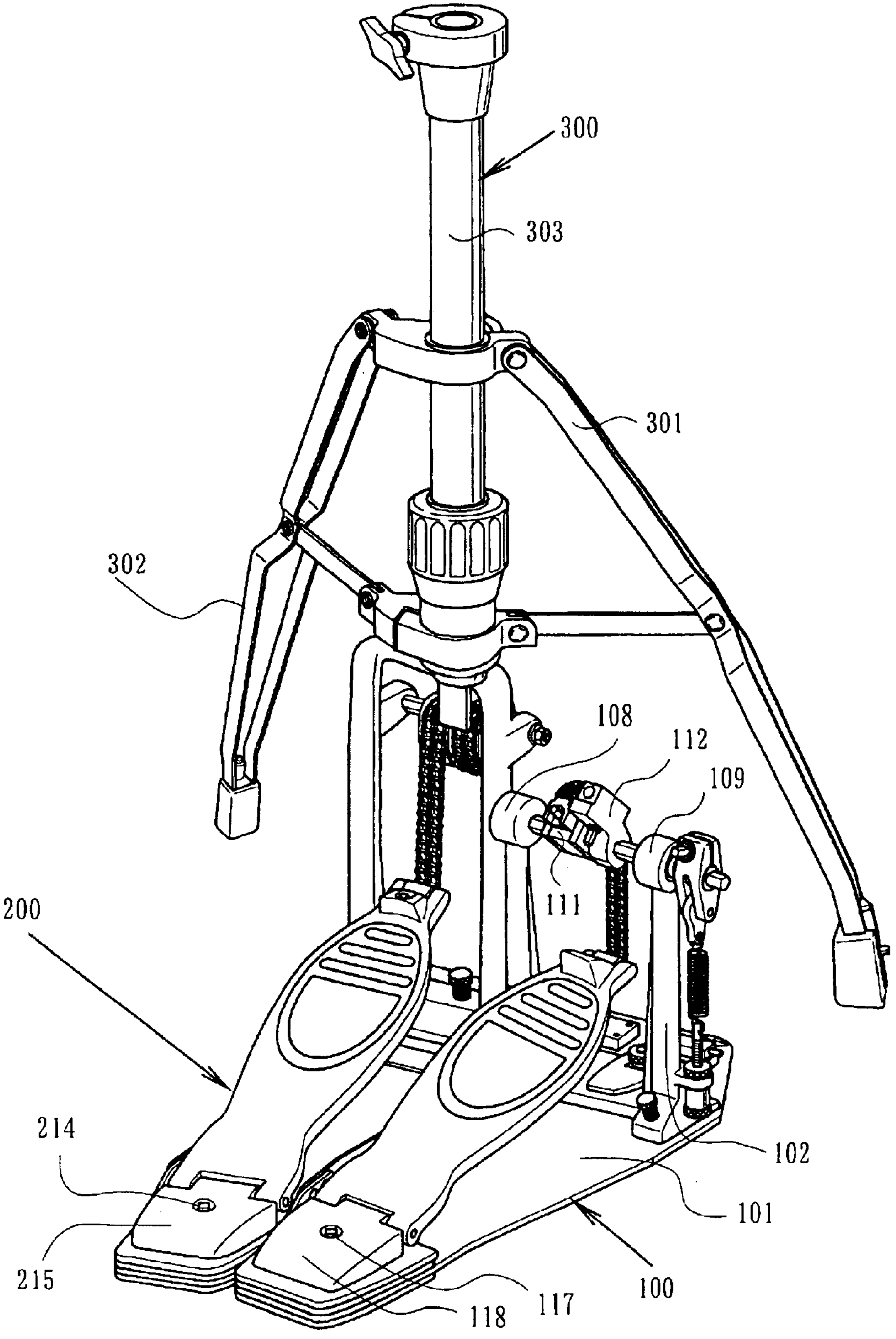
FIG. 1 is a front and perspective view for explaining an actual use aspect of a connected type foot pedal.
Figure 2:
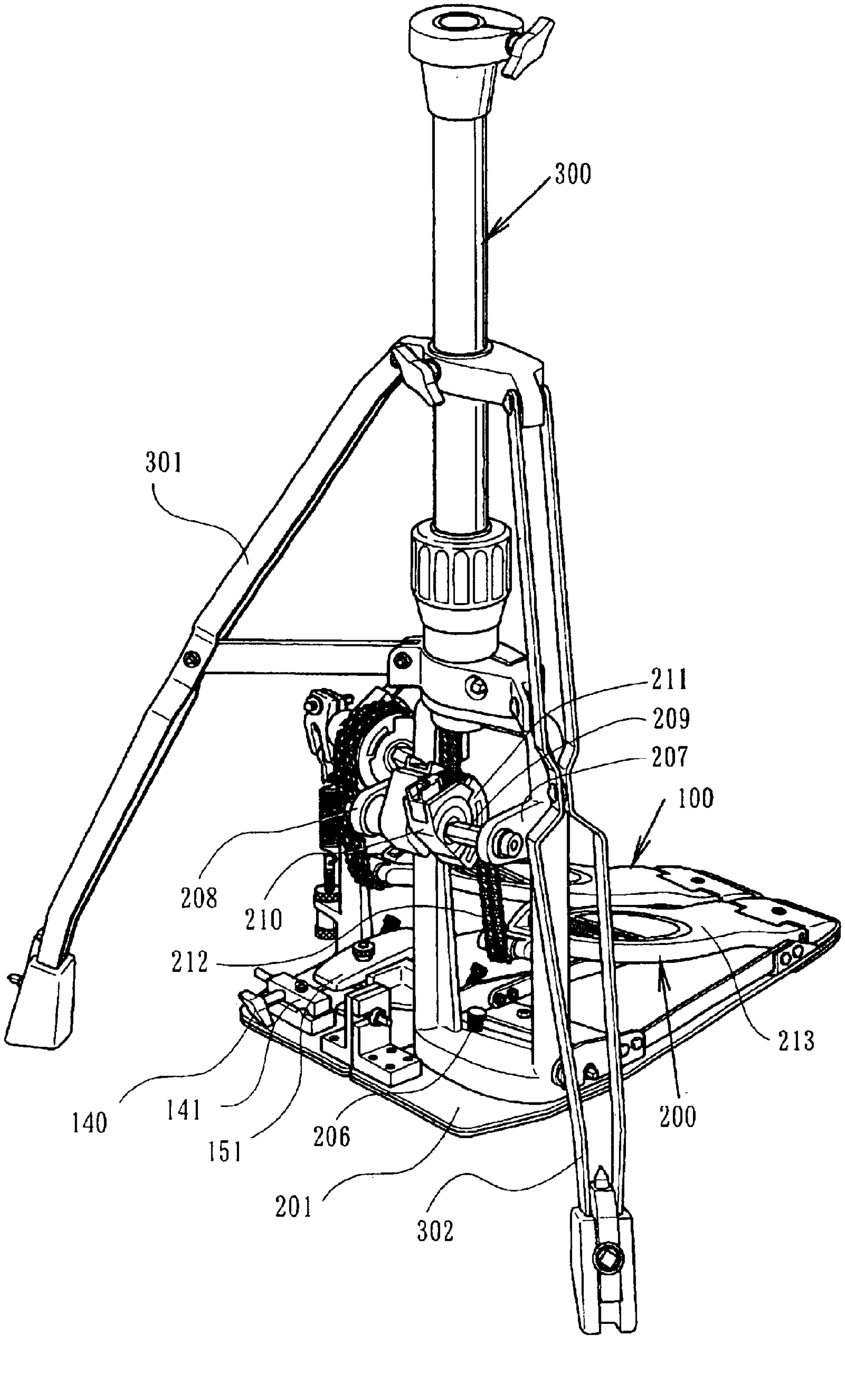
FIG. 2 is a rear and perspective view for explaining an actual use aspect of the connected type foot pedal.
Figure 3:
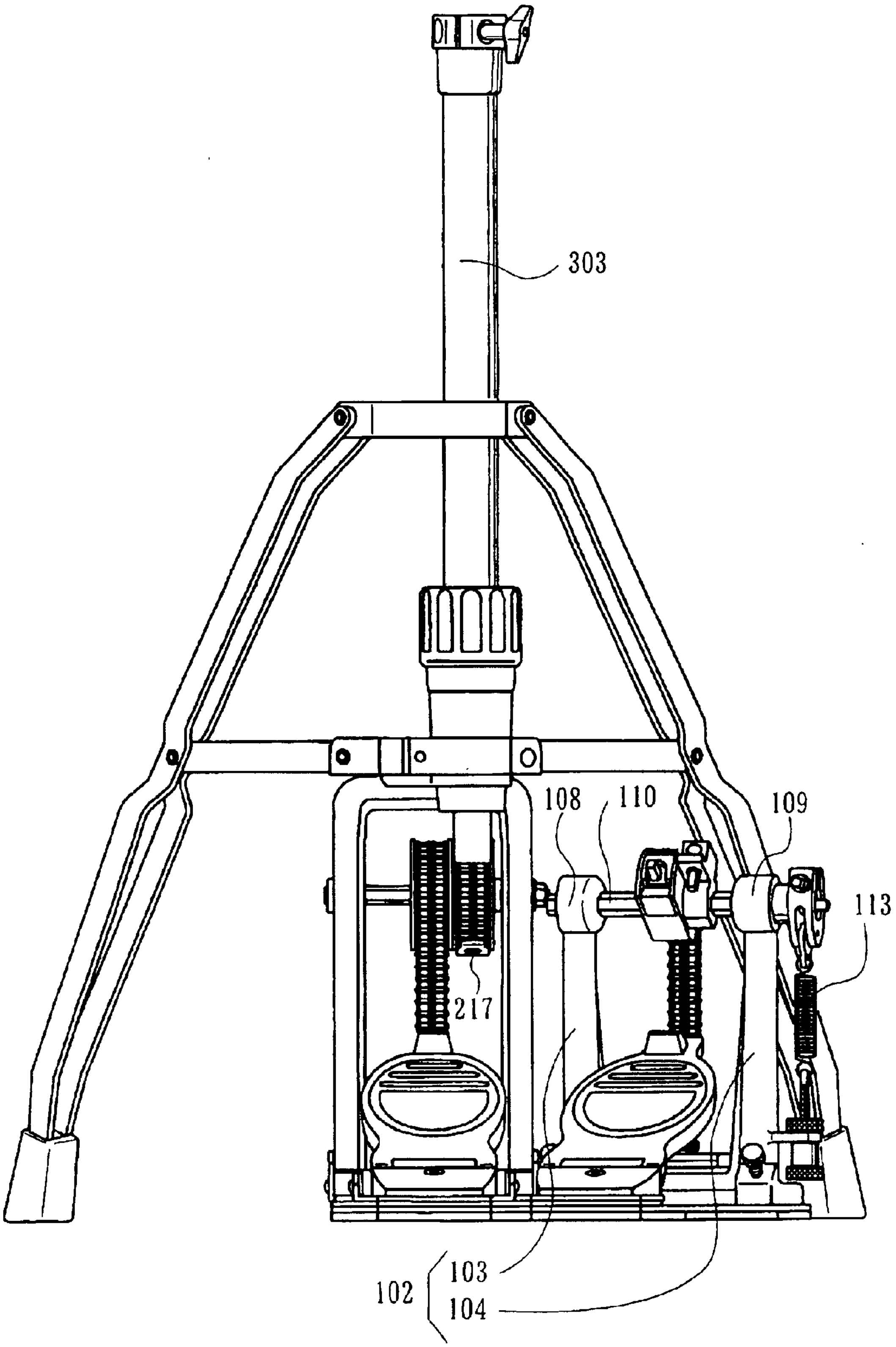
FIG. 3 is a front view of a connection type foot pedal of an embodiment of the present invention.
Figure 4:
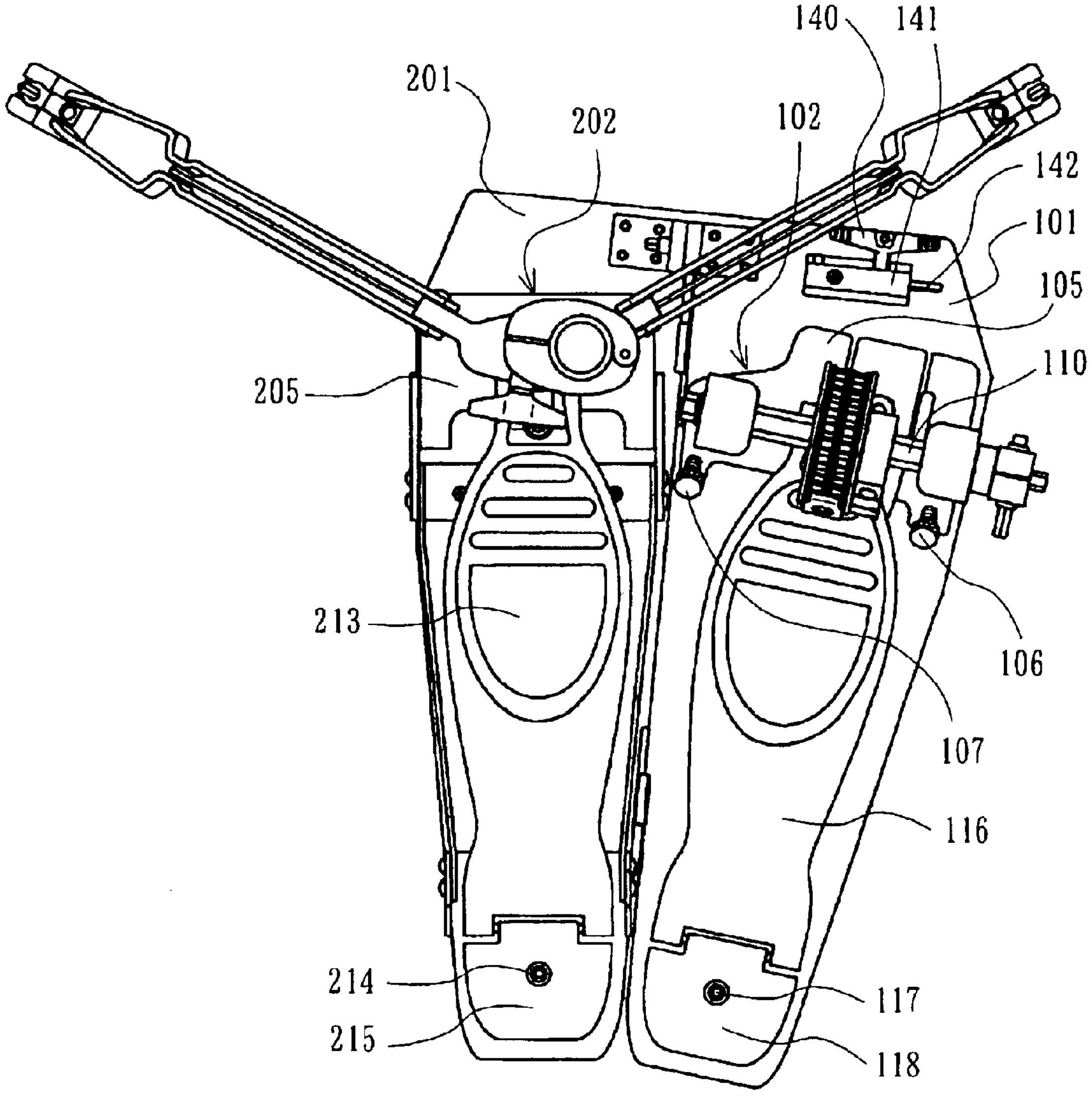
FIG. 4 is an upper view of the connection type foot pedal of the embodiment of the present invention.
Figure 5:
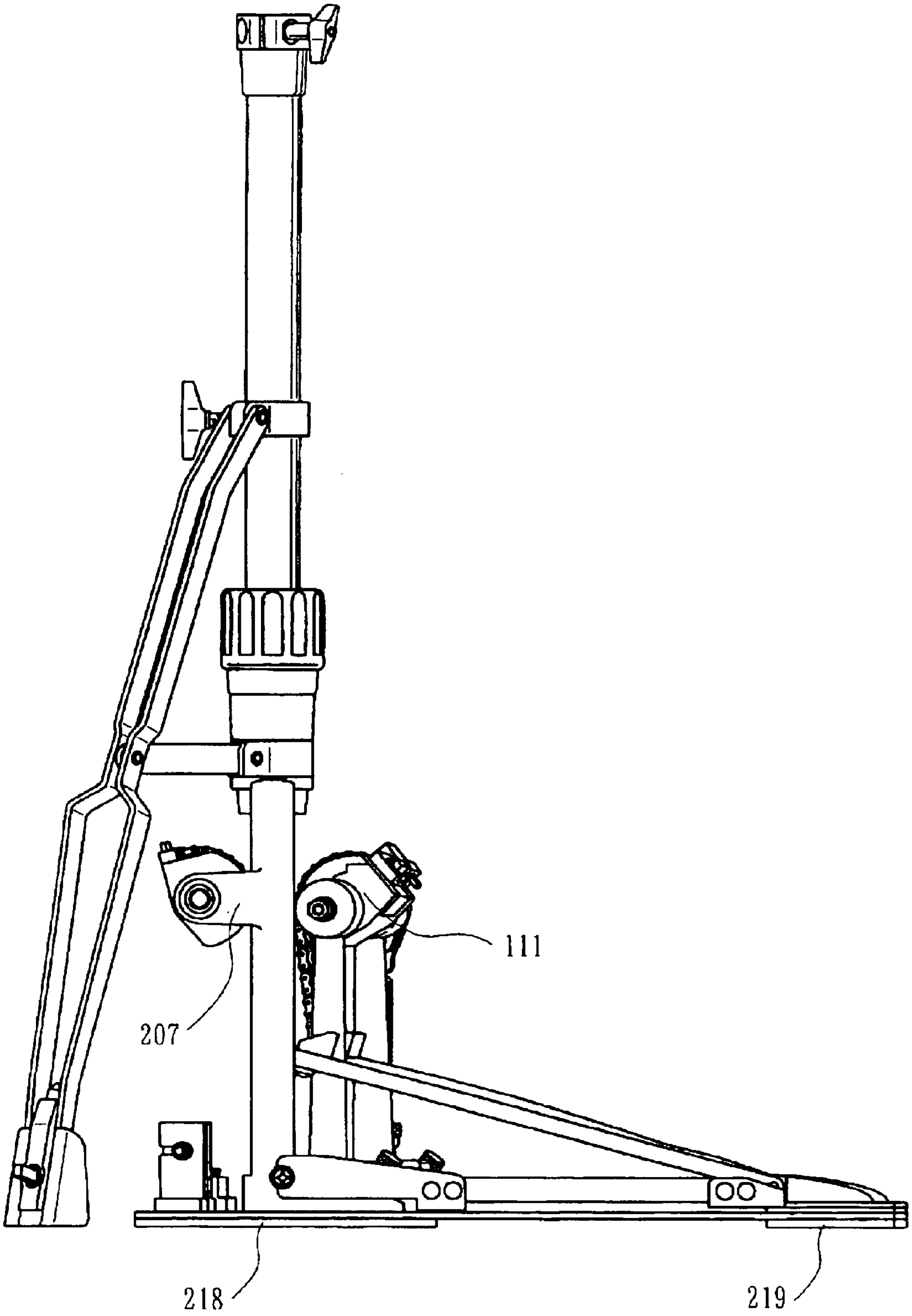
FIG. 5 is a left side view of the connection type foot pedal of the embodiment of the present invention.
Figure 6:
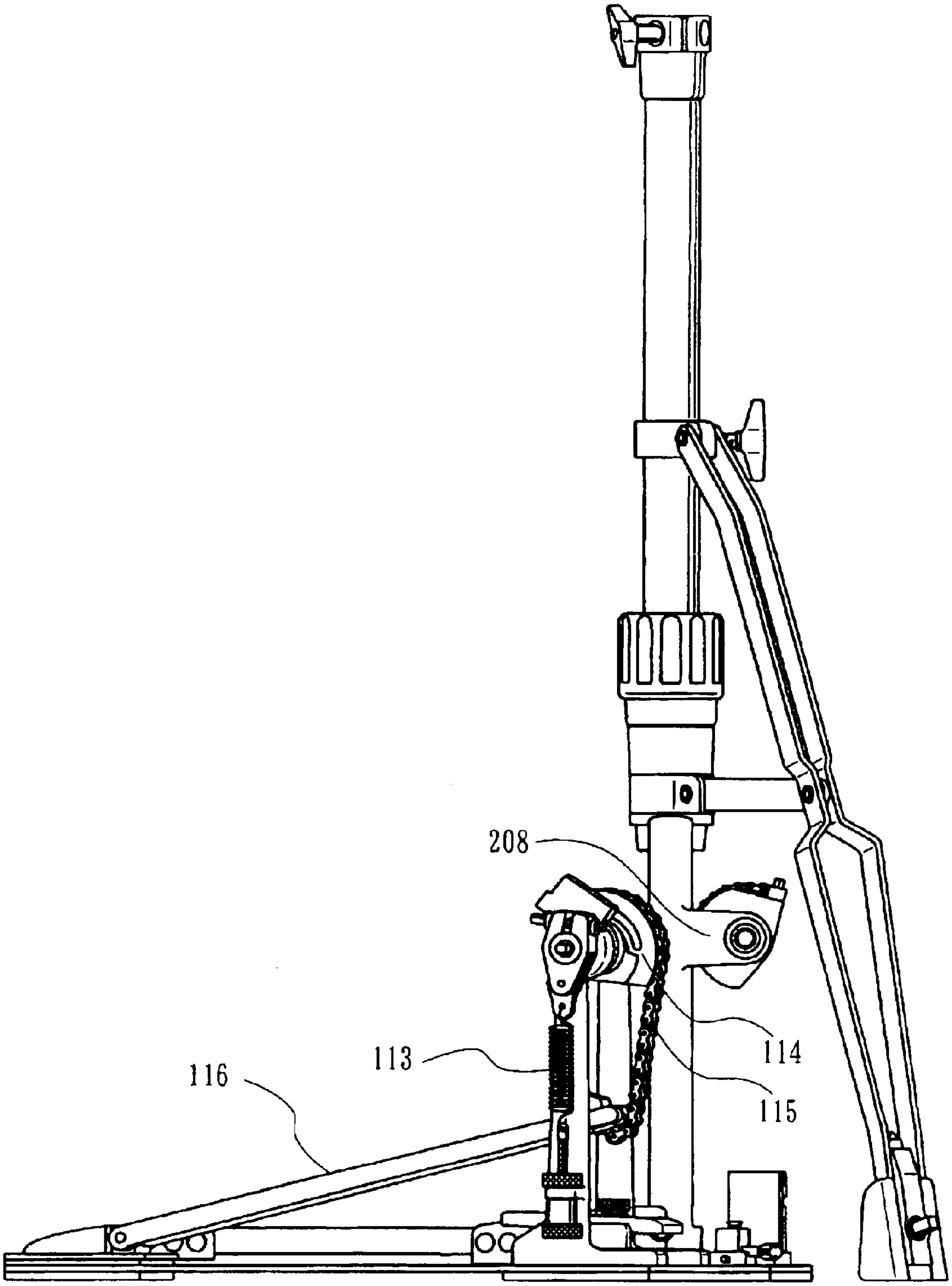
FIG. 6 is a right side view of the connection type foot pedal of the embodiment of the present invention.
Figure 7:
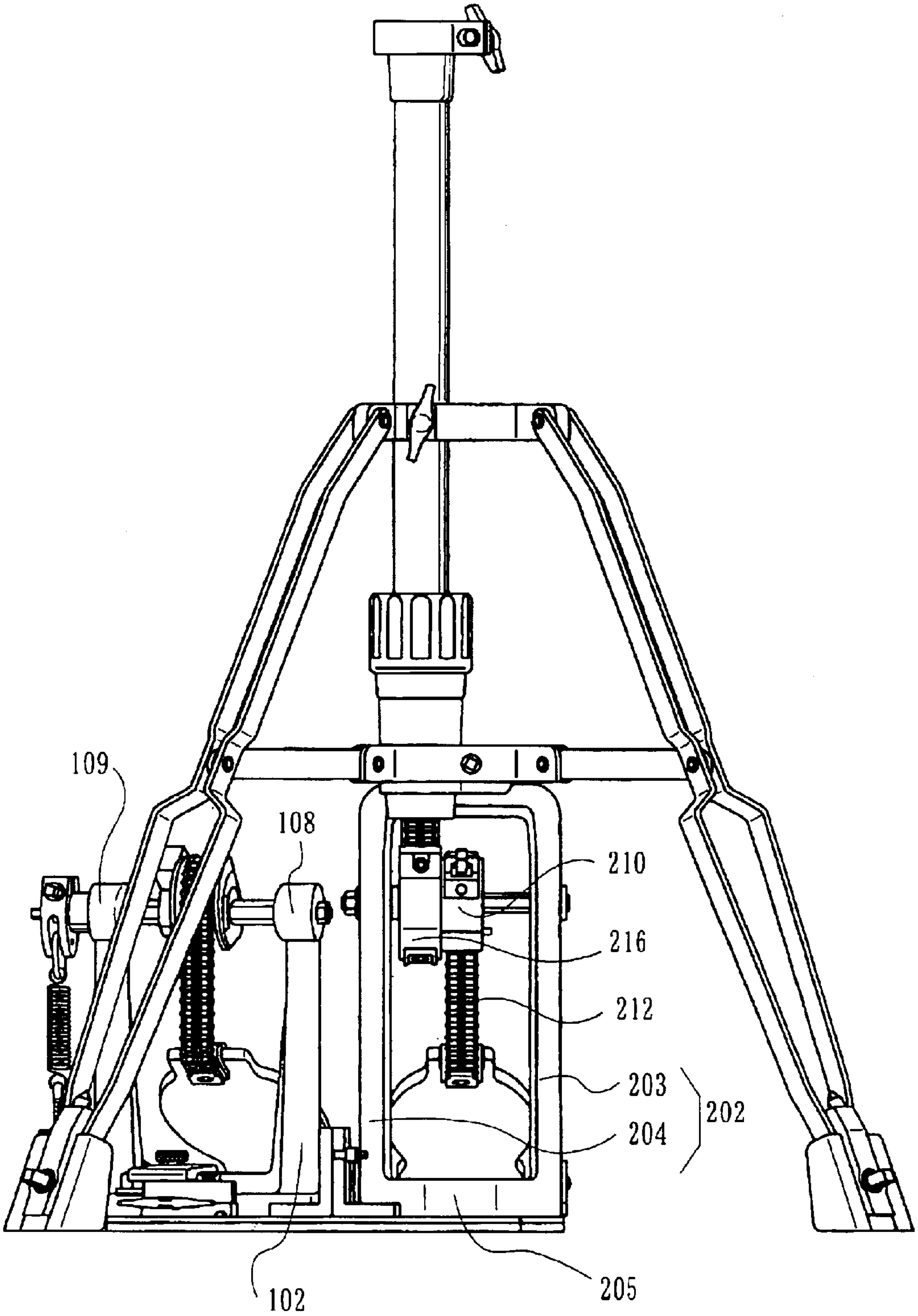
FIG. 7 is a rear view of the connection type foot pedal of the embodiment of the present invention.

First, FIG. 1 is a front and perspective view for explaining an actual use aspect of a connection type foot pedal, and FIG. 2 is a rear and perspective view for explaining the actual use aspect of the connection type foot pedal. Further, FIG. 3 is a front view of the connection type foot pedal, FIG. 4 is a top view thereof, FIG. 5 is a left side view thereof, FIG. 6 is a right side view thereof, and FIG. 7 is a rear view thereof.

Incidentally, for the convenience of explanation, a state where an upper portion of a hi-hat cymbal stand and hi-hat cymbals have been detached is shown in FIG. 1 to FIG. 7.

A shown in FIGS. 1 and 2, a connection type foot pedal comprises a foot pedal 100 for a bass drum, a foot pedal 200 for hi-hat cymbals and a hi-hat cymbal stand 300. The foot pedal 200 for hi-hat cymbals and the hi-hat cymbal stand 300 are mechanically jointed in one unit, and the connection type foot pedal is constituted by connecting the foot pedal 100 for a bus dram to the foot pedal 200 for hi-hat cymbals.

Next, the foot pedal 100 for a bass drum will be explained.

A "U"-or channel-shaped frame 102 (refer to FIG. 1, FIG. 3, FIG. 4 and FIG. 7) as viewed from a front side is provided in a standing manner at a front end portion of a first base plate 101 (refer to FIG. 1 and FIG. 4) on a surface thereof, and the frame 102 comprises a pair of struts 103 and 104 (refer to FIG. 3) and a bottom plate 105 (refer to FIG. 4). Incidentally, anchor screws are arranged at root portions of the struts 103 and 104, and distal end portions of the anchor screws are pierced in a floor face by screwing the anchor screws downwardly, so that the hoot pedal is prevented from deviating from the fixed position thereof.

Bearing portions 108 and 109 (refer to FIG. 1, FIG. 3 and FIG. 7) are provided at upper end portions of the struts 103 and 104, and a shaft 110 (refer to FIG. 3 and FIG. 4) is rotatably provided so as to be bridged between these bearing portions. A rocker 111 (refer to FIG. 1 and FIG. 5) is integrally fixed to the shaft 110, and a beater fixing portion 112 (refer to FIG. 1) is mounted adjacent to the rocker 111.

Since the foot pedal 100 for a bass drum is constituted such that it can be used as a foot pedal for a right foot of a player and a foot pedal for a left foot thereof, the beater fixing portion 112 is provided though a beater is not mounted thereto. In this embodiment, however, since the foot pedal 100 is used as the foot pedal 20 for a left foot of a player in the double foot pedal shown in FIG. 13, a beater is not required.

Further, a clamp fixture 151 shown in FIG. 2 remains, because the foot pedal 100 has been constituted by improving an existing foot pedal. Therefore, since the clamp fixture 151 is not required in this embodiment, it may be removed.

A spring 113 (refer to FIG. 3 and FIG. 6) for applying a returning force to the shaft 110 is mounted between one end portion of the shaft 110 and a proximal end portion of the strut 104.

A cam member 114 (refer to FIG. 6) is fixed on an outer peripheral face of the rocker 111, and a stepping force transmitting member 115 (refer to FIG. 6) such as a chain, a belt, a timing belt or the like is mounted along an outer peripheral face of the cam member 114. The stepping force transmitting member 115 is connected to a distal end portion of a pedal main body 116 (refer to FIG. 4 and FIG. 6).

On the other hand, the other end of the pedal main body 116 is pivoted to a heel 118 (refer to FIG. 1 and FIG. 4) connected to the first base plate 101 by a fixing screw 117 (refer to FIG. 1 and FIG. 4) swingably in a stepping direction.

Figure 13:
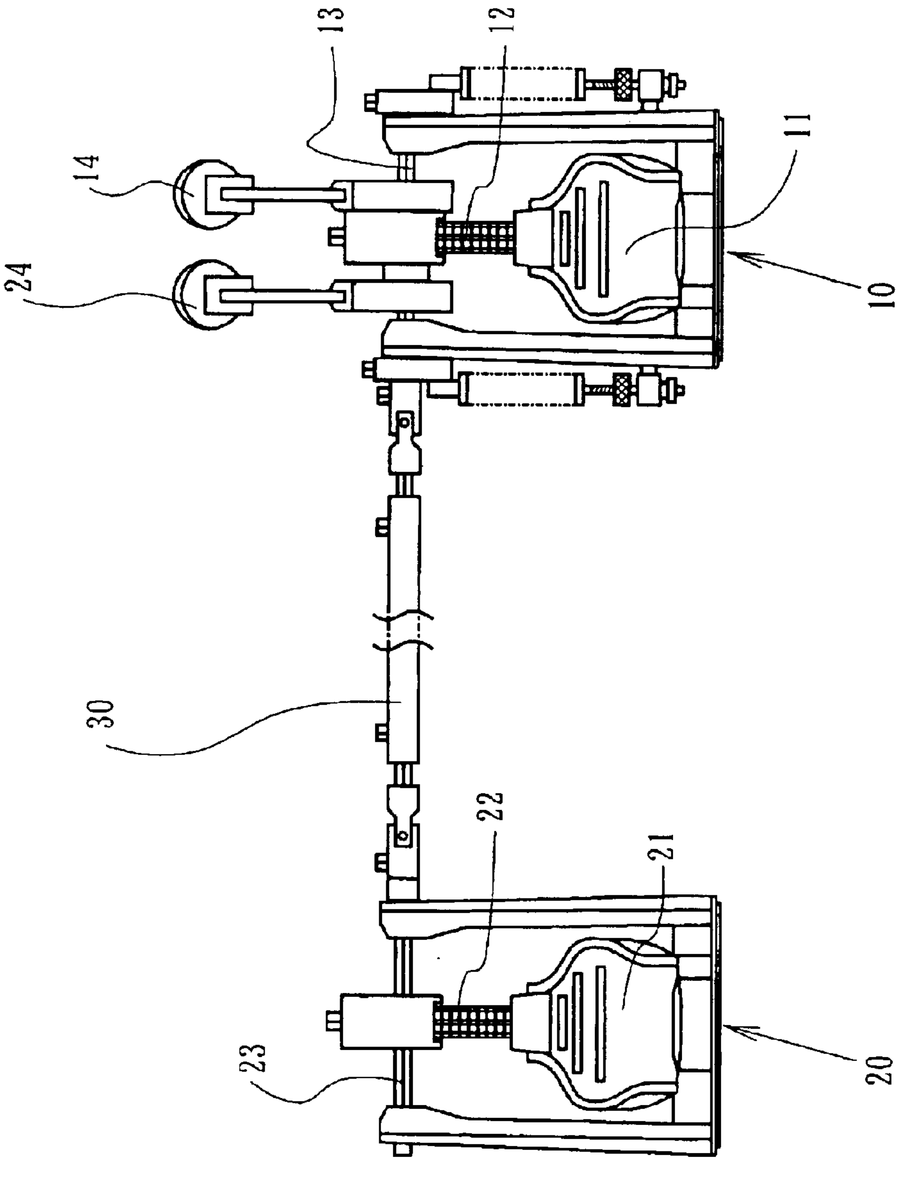
FIG. 13 PRIOR ART
FIG. 13 is an explanatory view of a double type drum pedal.

The second beater 24 shown in FIG. 13 is caused to beat a bass drum (not shown) by stepping operation of such a pedal main body 116.

Then, the foot pedal 200 for hi-hat cymbals and the hi-hat cymbal stand 300 will be explained in a connecting manner.

A generally square frame-shaped frame 202 (refer to FIG. 7) as viewed from a front thereof is provided in a standing manner at a front end portion of the second base plate 201 (refer to FIGS. 2 and 4) of the foot pedal 200 for hi-hat cymbals on a surface thereof, and the frame 202 comprises a pair of struts 203 and 204 (refer to FIG. 7) and a bottom plate 205 (refer to FIG. 4 and FIG. 7).

An anchor screw 206 (refer to FIG. 2) is disposed in the bottom plate 205, and a distal end portion thereof is pierced into a floor face by screwing the anchor screw 206 downwardly, so that the foot pedal 200 is prevented from deviating from its predetermined position.

Bearing portions 207 and 208 (refer to FIG. 2, FIG. 5 and FIG. 6) is provided at the struts 203 and 204, and a shaft 209 (refer to FIG. 2) is rotably provided so as to be bridged between the bearing portions 207 and 208. A rocker 210 (refer to FIG. 2) is integrally fixed to the shaft 209. A cam member 211 (refer to FIG. 2) is fixed to an outer peripheral face of the rocker 210, and a stepping force transmitting member 212 (refer to FIG. 2 and FIG. 7) such as a chain, a belt, a timing belt or the like is mounted along an outer peripheral face of the cam member 211. The stepping force transmitting member 212 is connected to a pedal main body 213 (refer to FIG. 4). On the other hand, a rear end portion of the pedal main body 213 is pivoted to a heel 215 (refer to FIG. 1 and FIG. 4) connected to the second base plate 201 by a fixing screw 214 (refer to FIG. 1 and FIG. 4) swingably along a stepping direction.

Further, another rocker 216 (refer to FIG. 7) is mounted to the shaft 209 adjacent to the rocker 210. A stepping force transmitting member 217 (refer to FIG. 3) is entrained about the rocker 216. The stepping force transmitting member 217 is inserted and received in a pipe body 303 (refer to FIG. 1 and FIG. 3) of the hi-hat cymbal stand 300 and it is attached to an upper cymbal of a pair of hi-hat cymbals (not shown). The stepping force transmitting member 217 is biased by a spring (not shown) disposed in the pipe body 303 and it is applied with a returning force for ascending the pedal main body 213 stepped (namely, for ascending a top or upper side cymbal (not shown)).

The top cymbal can be moved vertically by stepping operation on the pedal main body.

The hi-hat cymbal stand 300 is provided with legs 301 and 302 (refer to FIG. 1 and FIG. 2) and it is also provided at a central portion with the pipe body 303. The hi-hat cymbal stand 300 is supported at three points comprising the second base plate 201 and the foot pedal 200 for hi-hat cymbals in addition to these legs 301 and 302, so that it can stand stably.

Then, a connection structure of the foot pedal 100 for a bass drum and the foot pedal 200 for hi-hat cymbals will be explained with reference to the drawings.

Figure 8A:
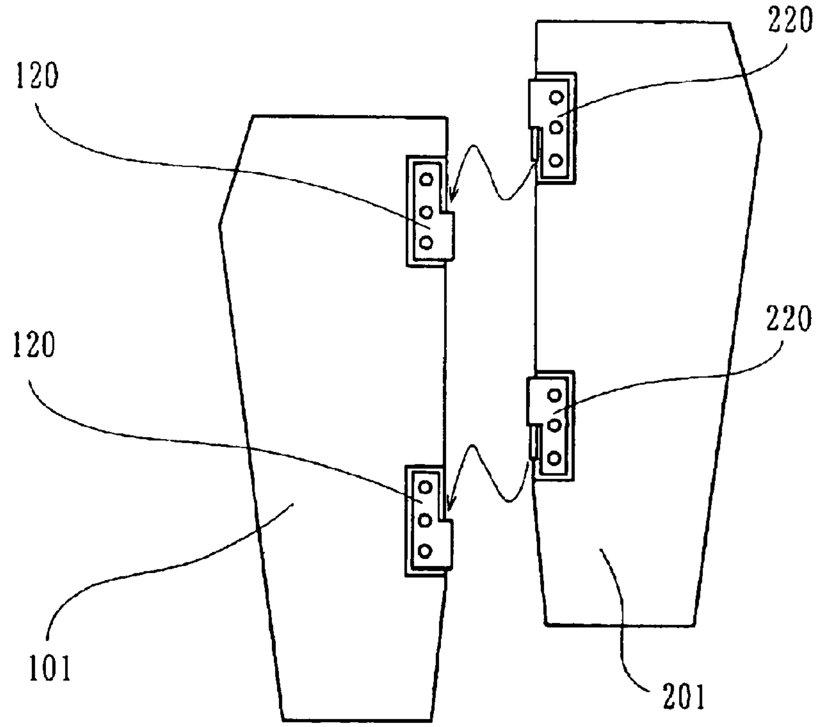
FIG. 8 is a bottom view of the connection type foot pedal.
Figure 8B:
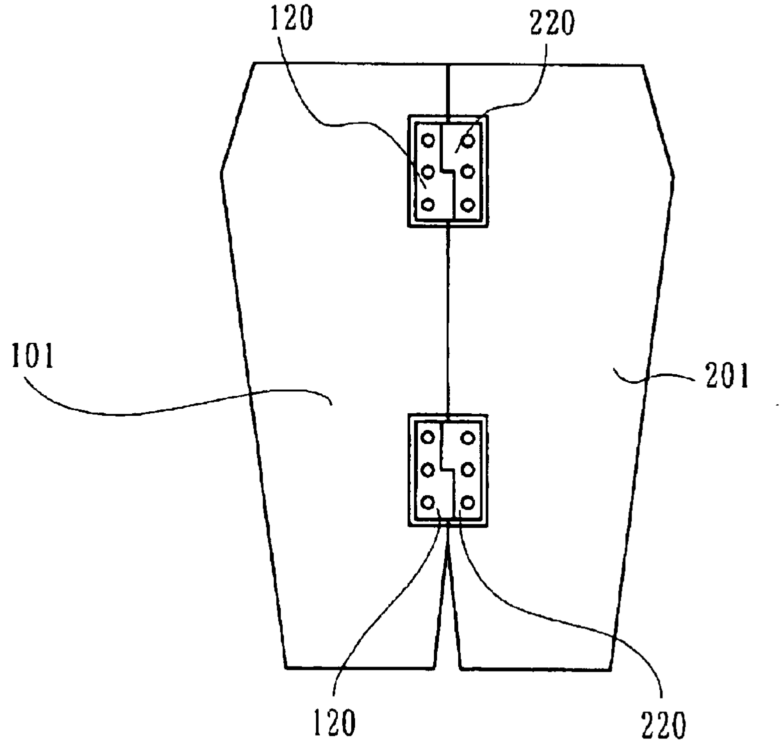
Figure 9A:
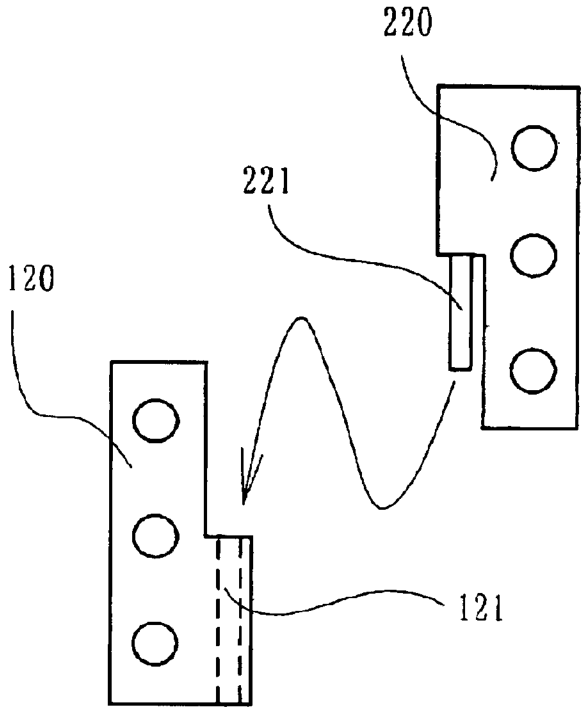
FIGS. 9A and 9B are enlarged views of a hinge of a specific example of a connecting tool.
Figure 9B:
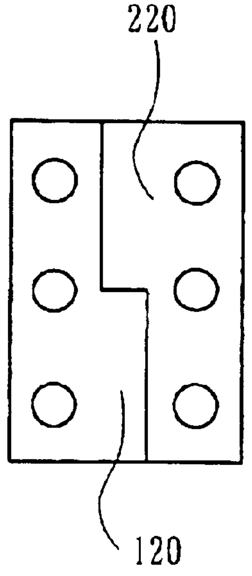
Figure 10A:
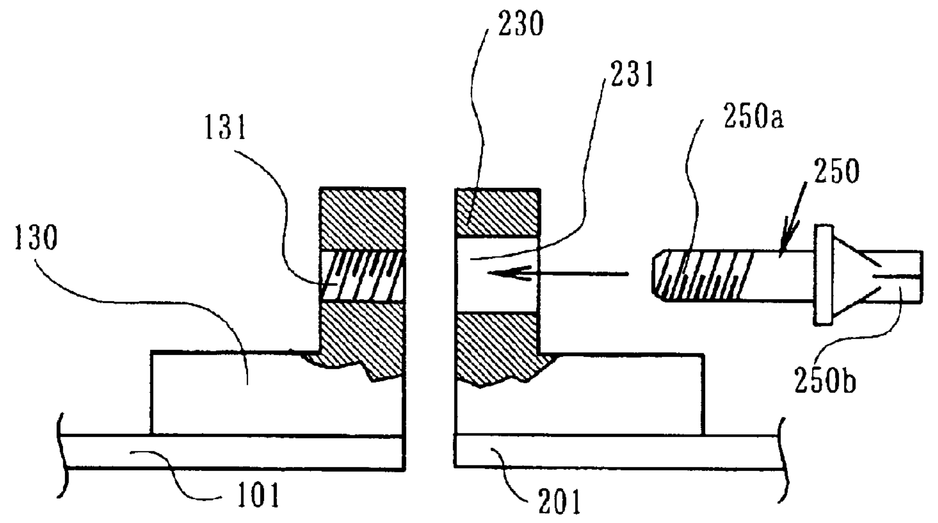
FIGS. 10A and 10B are enlarged views of a specific example of a fixing tool.
Figure 10B:
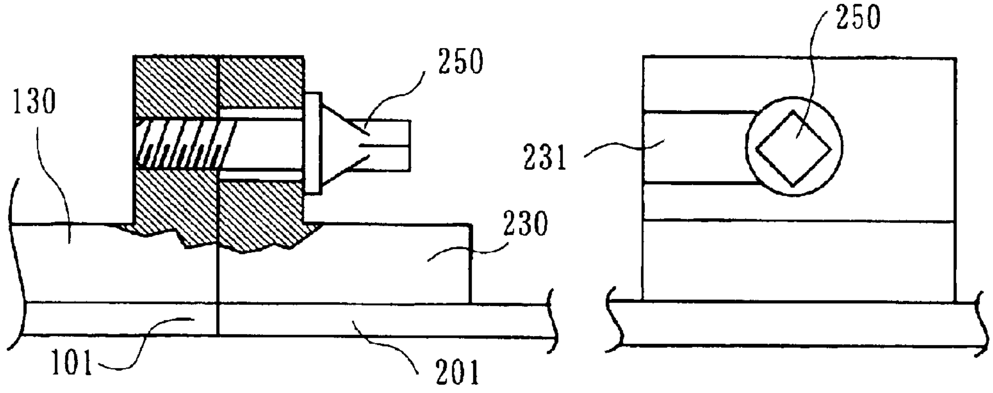

FIGS. 8A and 8B are bottom views of the connection type foot pedal, FIG. 8A being an explanatory view of a disconnected state and FIG. 8B being an explanatory view of a connected state. FIGS. 9A and 9B are enlarged views of a hinge which is a specific example of a connecting tool, FIG. 9A being an explanatory view of a disconnected state of the hinge and FIG. 9B being an explanatory view of a connected state thereof. FIGS. 10A and 10B are enlarged views of one specific example of a fixing tool, FIG. 10A being an explanatory view of a disconnected state and FIG. 10B being an explanatory view of a connected state.

As shown in FIG. 8A, two first hinge members 120 are mounted to the first base plate 101, and two second hinge members 220 are mounted to the second base plate 201. As shown in FIG. 9A, the first hinge 120 has a hole portion 121 and the second hinge member 220 has an axial portion 221, and a pair of the first hinge member 120 and the second hinge member 220 is constituted by fitting the axial portion 221 into the hole portion 121, as shown in FIG. 9B.

As shown in FIG. 8B, the first base plate 101 and the second base plate 201 are connected in a state that the hinge has been formed.

Incidentally, as shown in FIG. 5, rubber plates 218 and 219 are attached to bottom faces of the first base plate 101 and the second base plate 201. For convenience sake, these rubber plates are omitted in FIG. 8.

After the first base plate 101 and the second base plate 201 is connected to each other, both the base plates 101 and 201 (namely, the foot pedal 100 for a bass drum and the foot pedal 200 for hi-hat cymbals) are fixed to each other by a fixing tool.

As shown in FIG. 10A, the fixing tool comprises a first fixing portion 130 which is an L-shaped member and is fixed to a surface of the first base plate 101, a second fixing portion 230 which is an L-shaped member and is fixed to a surface of the second base plate 201, and a fixing screw 250 (one specific example of a fastening portion) for fixing the first fixing portion 130 and the second fixing portion 230 to each other. Therefore, the first base plate 101 and the second base plate 201 are connected to each other and the first fixing portion 130 and the second fixing portion 230 are connected to each other, and the first fixing portion 130 and the second fixing portion 230 are connected and fixed to each other by the fixing screw 250.

As shown in FIG. 10A, fastening or fixation is conducted by inserting a screw portion 250*a* of the fixing screw 250 into a groove or hole portion 231 of the second fixing portion 230 to screw the screw portion 250*a* into a screw hole portion 131 of the first fixing portion 130, then removing a drum key (exclusive trench) 140 shown in FIG. 2 and FIG. 4, and rotating the drum key 140 and a column portion 250*b* with a rectangular section of the fixing screw 250 which have been fitted to each other to achieve a state such as shown in FIG. 10B. The first base plate 101 and the second base plate 201 connected by the connecting tool can be firmly fixed by the fixing tool.

Incidentally, as shown in FIG. 2 and FIG. 4, it is preferable that the drum key 140 is held by a key holding portion 141. As a mechanism for the holding, a mechanism clamping the drum key 140 utilizing a recovering force of a spring can be employed. That is, the drum key 140 is usually held in the key holding portion 141, and it is made in a usable state by pulling out the drum key 140 in a horizontal direction at a time of use. After the key has been used, the key holding mechanism 141 is opened to be capable of holding an end portion of the drum key 140 by catching a lever 142 shown in FIG. 4 with a finger to lift up the same.

Though the embodiment of the present invention has been explained above, such a constitution is preferably employed that an angle of the pedal main body can be adjusted in a horizontal plane. That is, the angle between the foot pedal 100 for a bass drum and a foot pedal 200 for hi-hat cymbals is eventually determined evenly according to the above structure. However, since an angle most suitable for playing will exist for each player, for example, it is preferable that the angle of the foot pedal 200 for hi-hat cymbals is adjustable within a horizontal plane.

The angle adjusting mechanism will be explained below with reference to the drawings.

Figure 11A:
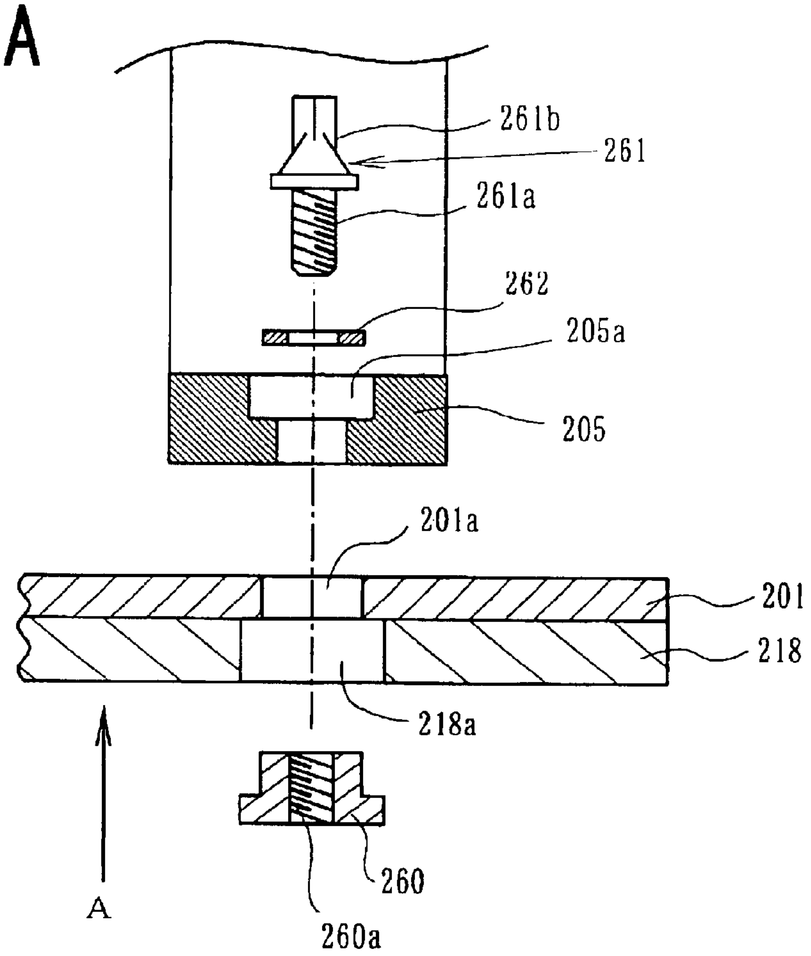
FIGS. 11A and 11B are views for explaining an angle adjusting mechanism of a pedal main body in a foot pedal for hi-hat cymbals.
Figure 11B:
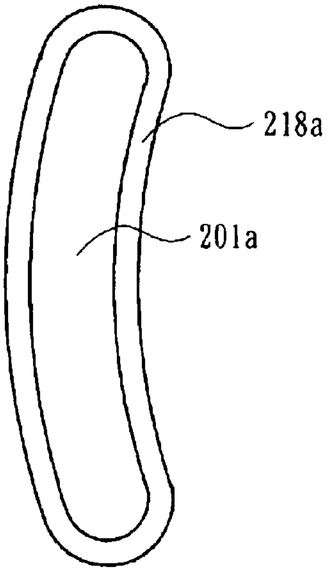
Figure 12:
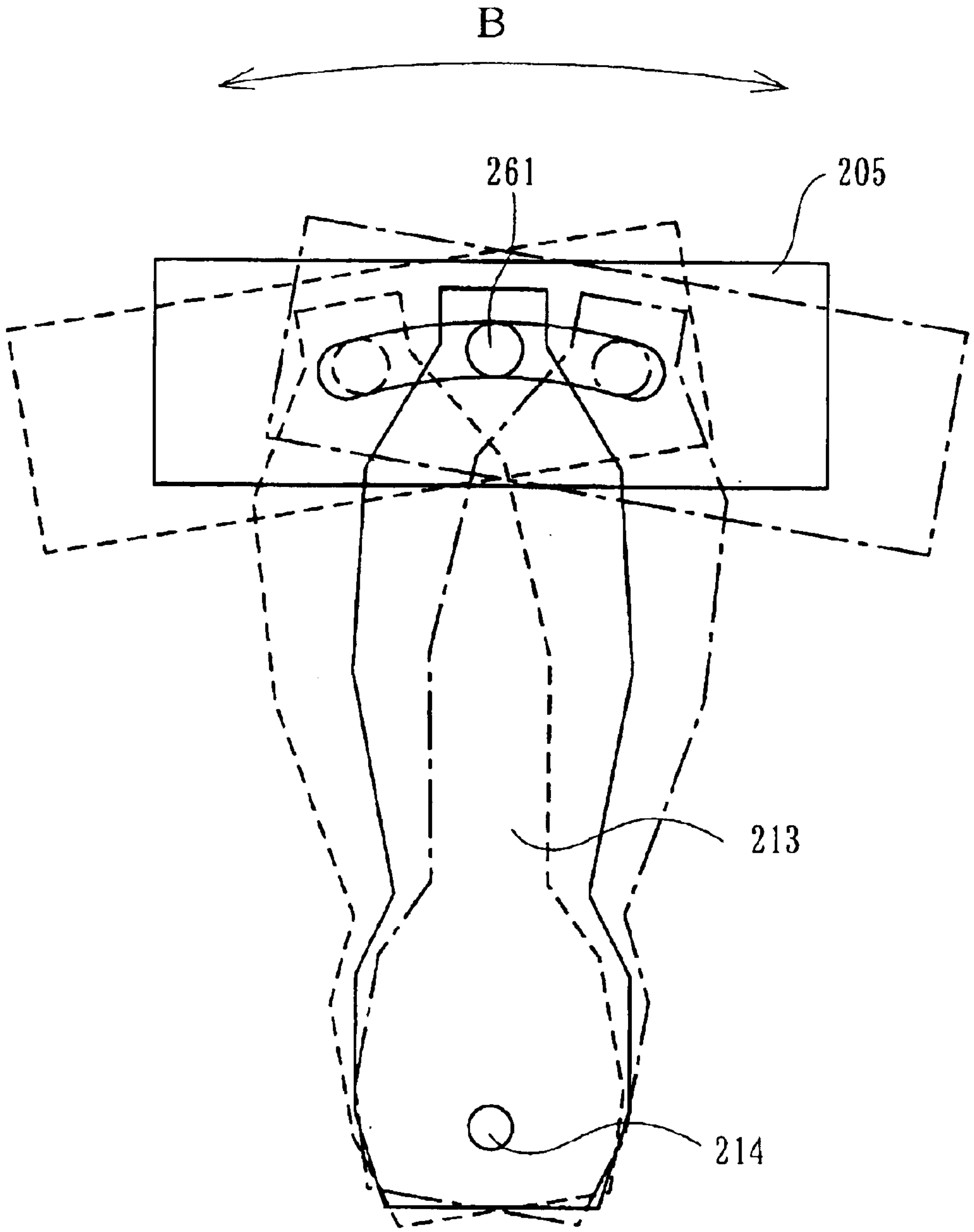
FIG. 12 is an explanatory view of an angle adjustment using the angle adjusting mechanism.

FIGS. 11A and 11B are explanatory views for explaining an angle adjusting mechanism of a pedal main body in the foot pedal for hi-hat cymbals, and FIG. 12 is an explanatory diagram of an angle adjustment used in the angle adjusting mechanism.

In the angle adjusting mechanism, the frame 102 is movable to the second base plate 201 such as shown in FIG. 4 in an arc manner within a horizontal plane, which allows pivoting of the pedal main body 213 about the fixing screw 214, and the pedal main body 213 is moved in a direction of arrow B, as shown in FIG. 12.

As shown in FIG. 5, rubber plates 218 and 219 are attached to a back face of the second base plate 201 (incidentally, rubber plates (not shown) are also attached to a back face of the first base plate 101). Arc-shaped elongated holes 201*a* and 218*a* such as shown in FIG. 11B as viewed in a direction of arrow A in FIG. 11A are provided on a front end sides of the rubber plate 218 and the second base plate 201. Further the elongated holes 201*a* and 218*a* are constituted so as to be insertable with a nut 260.

On the other hand, a hole 205*a* with a counterbore is bored in the bottom plate 205 of the frame 202, and a fixing screw 261 is inserted into the hole 205*a* via a washer 262. The fixing screw 261 is screwed into the nut 260 so that the frame 202 is movable to the second base plate 201 in an arc manner.

When the frame 202 is moved in this manner, as shown in FIG. 12, the pedal main body 213 is pivoted about the fixing screw 214 in a direction of arrow B. The above-described drum key 140 is fitted into the column 216*b* with a rectangular section of the fixing screw 261 at a predetermined position so that the bottom plate 205 of the frame 202 is fixed. For example, the pedal main body 213 of the foot pedal 200 for hi-hat cymbals can be positioned at a position shown by a broken line in FIG. 12 or at a position shown by a dotted chain line, so that the angle of the pedal main body 213 can be changed to the pedal main body 116 of the foot pedal 100 for a bass drum.

The embodiment of the connection type foot pedal of the present invention has been explained. In the connection type foot pedal, the above explanation has been made assuming that the foot pedal 100 for a bass drum is a foot pedal for a left foot of a player of the dual drum pedal. However, for example, the present invention is, of course, applicable to a case that a foot pedal for a left foot of a player in a drum set of a double type drum system is connected to a foot pedal for hi-hat cymbals or a case that a left-handed player connects a foot pedal for a right foot to a foot pedal for hi-hat cymbals.

These matters can be modified by those skilled in the art properly according to actual situations.

What is claimed is:

1. A connection type foot pedal comprising:

a first base plate which is attached with a foot pedal for a bass drum which beats a bass drum by swinging a beater according to stepping operation of a pedal main body of the foot pedal for a bass drum;

a second base plate which is attached with a foot pedal for hi-hat cymbals for beating top and bottom cymbals to each other according to stepping operation of a pedal main body of the foot pedal for hi-hat cymbals;

a connecting tool which connects the first base plate and the second base plate to each other;

a fixing tool which fixes the first base plate and the second base plate, wherein one of two parts of a hinge serving as the connecting tool is attached to the first base plate and the other thereof is attached to the second base plate, the fixing tool is provided with a first fixing portion fixed to the first base plate, a second fixing portion fixed to the second base plate and a fastening portion which fastens the first fixing portion and the second fixing portion, and the first base plate and the second base plate are connected to each other by the hinge, and the first fixing portion and the second fixing portion are connected and fixed to each other by the fastening portion.

2. A connection type foot pedal according to clam 1 wherein the foot pedal for a bass drum is one of two foot pedals in a dual type drum pedal.

3. A connection type foot pedal according to claim 1, wherein the foot pedal for hi-hat cymbals is fixable to the first base plate after being swung by a predetermined angle within a plane defined by a face of the first base plate.

4. A connection type foot pedal according to claim 2, wherein the foot pedal for hi-hat cymbals is fixable to the first base plate after being swung by a predetermined angle within a plane defined by a face of the first base plate.

* * * * *